(12) United States Patent
Vallance

(10) Patent No.: US 6,287,062 B1
(45) Date of Patent: Sep. 11, 2001

(54) HOLD DOWN STRAP WITH TIE-OFF LOOP

(76) Inventor: Richard Vallance, 628 Marksbury Rd., Pickering, Ontario (CA), L1W 2S8

( * ) Notice: Subject to any disclaimer, the term of this patent is extended or adjusted under 35 U.S.C. 154(b) by 0 days.

(21) Appl. No.: 09/313,367

(22) Filed: May 18, 1999

(51) Int. Cl.[7] .................................................. B60P 7/08
(52) U.S. Cl. .............................. 410/97; 410/100; 410/103
(58) Field of Search .............................. 410/96, 97, 100, 410/101, 103; 24/265 CD, 302, 299; 248/499

(56) References Cited

U.S. PATENT DOCUMENTS

| | | | |
|---|---|---|---|
| 2,998,625 | * | 9/1961 | Huber ........................................ 410/97 |
| 4,611,961 | * | 9/1986 | Van Iperen et al. ..................... 410/20 |
| 4,884,928 | * | 12/1989 | Nachtigall et al. ..................... 410/103 |
| 5,193,955 | * | 3/1993 | Chou ........................................ 410/100 |
| 5,458,447 | * | 10/1995 | Clason ..................................... 410/100 |
| 5,664,918 | * | 9/1997 | Heider et al. ........................... 410/103 |
| 5,784,761 | * | 7/1998 | Allen ....................................... 410/96 X |
| 5,888,039 | * | 3/1999 | Cooley .................................... 410/97 X |
| 5,993,127 | * | 11/1999 | Shinn ....................................... 410/100 |
| 6,015,250 | * | 1/2000 | Walsh et al. ............................ 410/100 |

* cited by examiner

*Primary Examiner*—Stephen T. Gordon
(74) *Attorney, Agent, or Firm*—Gowling Lafleur Henderson LLP

(57) ABSTRACT

A load securing apparatus for securing a load to a structure, the apparatus having a strap with first and second opposite ends to the first of which is attached a connector part. The connector part enables securement of the strap to a mating connector part on the structure. The second end of the strap is securable to a tie down reel secured to the structure. At least one tie-off loop is securely fastened to the strap to allow attachment of a hook to the strap. The apparatus may be a hold down strap for a transport trailer and the loop, of which there may more than one, may provide securement for a lanyard hook.

5 Claims, 2 Drawing Sheets

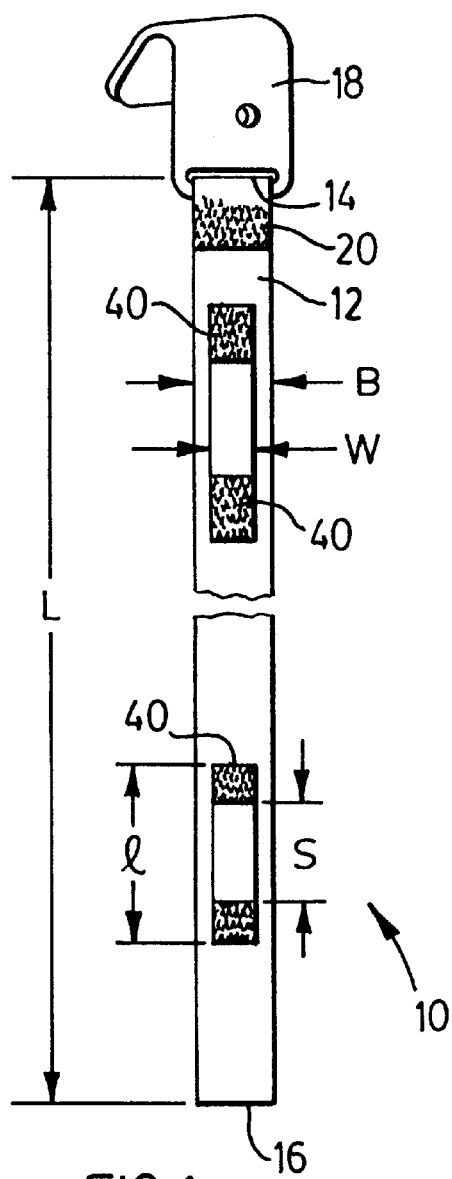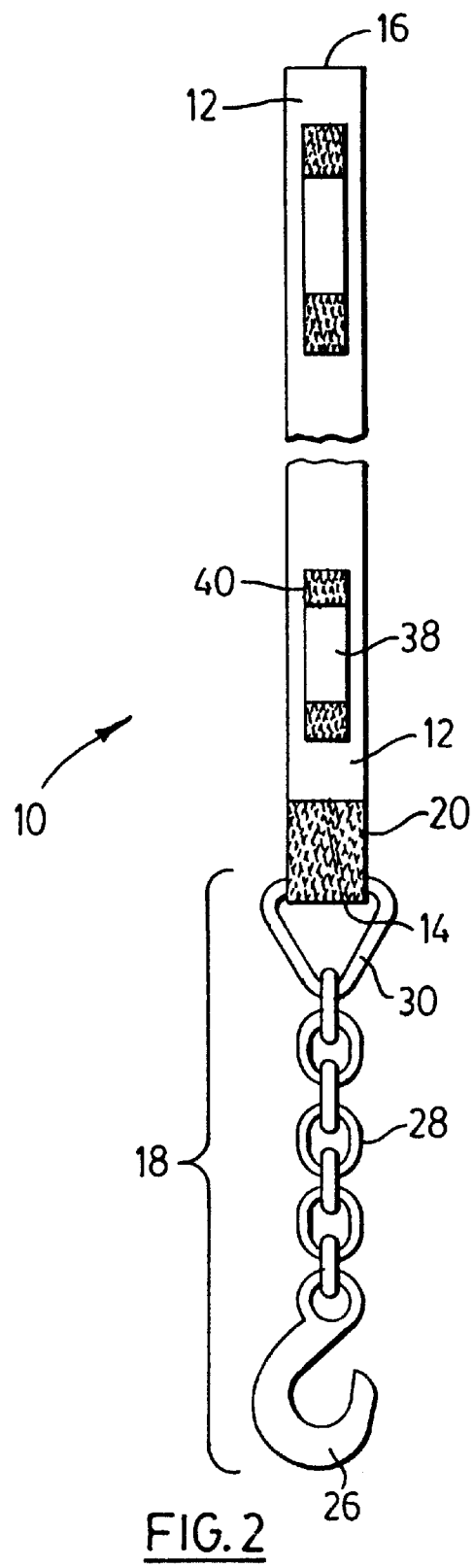
FIG. 1
FIG. 2

US 6,287,062 B1

HOLD DOWN STRAP WITH TIE-OFF LOOP

FIELD OF THE INVENTION

This invention generally relates to load securing straps for transport trucks and more particularly to the securement of a safety harness to such straps.

BACKGROUND TO THE INVENTION

In the trucking industry, a common way to secure a load to a flatbed truck is with straps of suitably strong material (such as polyester and/or nylon webbing) over the load and secured to attachment points on both sides of the truck bed.

As transport truck beds are rather high off of the ground a significant safety risk is faced by operators in securing loads by way of falling injuries. Walking around on truck beds and particularly on the load itself carries a significant falling risk, particularly if the load is ice or snow covered and possibly even moreso if a tarpaulin covers the load.

In some jurisdictions, Occupational Health and Safety legislation requirements affecting the trucking industry requires workers (including transport truck drivers and other workers) to be "tied off" for example where they may be in danger of falling 3 meters (10 feet) or more in Canada, and 2 meters (6 feet) or more in the United States. Unfortunately neither the load nor the transport truck provide tie-off points.

It is an object of the present invention to provide, for a worker on a transport truck wearing a full body harness and lanyard, a structure having a suitable tie-off point for securement of a lanyard hook attached to the lanyard.

SUMMARY OF THE INVENTION

A load securing apparatus for securing a load to a structure, the apparatus having a strap with first and second opposite ends, to the first end of which is attached a respective connector part. The connector part enables securement of the strap to a mating connector part on the structure. At least one tie-off loop is securely fastened to the strap to allow attachment of a hook to the strap.

The apparatus may be a hold down strap for a transport trailer and the loop, of which there may more than one, may provide securement for a lanyard hook.

DESCRIPTION OF DRAWINGS

A preferred embodiment of the present invention is described below with reference to the accompanying drawings in which:

FIG. 1 is a perspective view of a load securing apparatus according to the present invention;

FIG. 2 is a perspective view of an alternate embodiment of a load securing apparatus according to the present invention; and, FIG. 3 is a perspective view of a transport truck bed to which a load securing apparatus according to the present invention is secured;

DESCRIPTION OF PREFERRED EMBODIMENTS

Figure 3:
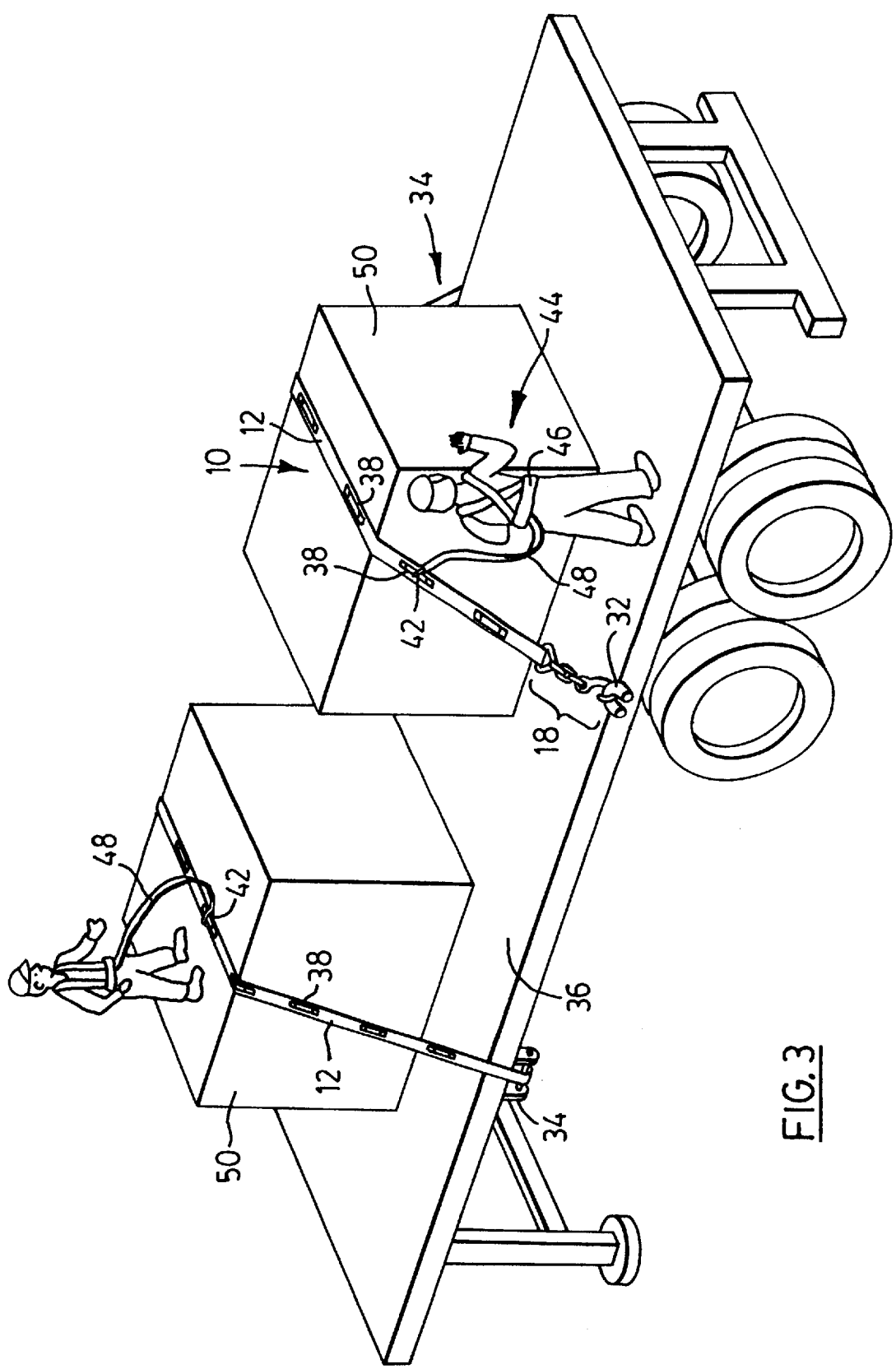

A load securing apparatus according to the present invention is generally indicated by reference 10 in FIGS. 1, 2 and 3. The apparatus 10 has a strap 12 having a first end 14 and a second end 16 opposite the fist end 14. A connector part 18 in the form of a plate hook in FIG. 1 is attached to the first end 14 by suitable means such as looping the first end 14 and securing the loop by means such as stitching 20.

In the FIG. 2 embodiment, the connector part 18 includes a chain hook having a hook 26 and a chain 28 securing the hook 28 to a triangular member 30. The connector part 18 may be secured to the strap 12 by looping the first end 14 of the strap through the triangular ring 30 and securing the loop by suitable means such as stitching 20.

The connector part 18 may be commonly used tie down hardware and the strap 12 may be of a polyester and/or nylon webbing such as commonly used for tie down straps. The connector part 18 and second end 16 are securable to a mating connector part 32 in FIG. 3 to secure the first end 14 of the strap 12 to a structure such as a transport truck bed 36 illustrated in FIG. 3. The second end 16 is securable to a tie down reel 34 as with conventional hold down straps.

The strap 12 has at least one tie-off loop 38 securely fastened thereto such as by stitching 40. The tie-off loop 38 provides an attachment point for a hook, such as a lanyard hook 42 to the strap. The tie-off loop 38 therefore enables a worker 44, who may be the transport truck driver or another worker, a place to secure a safety harness 46 to which a lanyard 48 is connected.

Preferably the load securing apparatus 10 will have a plurality of tie-off loops 38, for example spaced about 3 feet (approximately 1 meter) apart to provide a convenient tie-off point within easy reach of the worker 44 at virtually any location on the transport truck bed 36 or a load 50 on the bed 36.

The strap 12 would typically have a breadth B of from 3 in. to 4 in. (approximately 7.6 to 10.1 cm.), and have a length L of from 10 to 50 feet (3.65 to 18.24 m.). The tie of loops 38 may be of a similar material to the strap 12 but of a narrower breadth W to accommodate a hook. The tie-off loop 38 may typically be about 2 in. (5 cm.) in breadth and about 11½ in. (approximately 29 cm.) in length l with a span S of about 4 in. (approximately 10 cm) between the areas of stitching 40.

The above description is intended in an illustrative rather than a restrictive sense. Variations may be apparent to persons skilled in such apparatus without departing from the spirit and scope of the invention as defined by the claims set out below.

What is claimed is:

1. A load securing apparatus for securing a load to a truck bed, said apparatus comprising:

a strap having first and second opposite ends, said second end being securable to a tie down reel secured to said truck bed;

a hook attached to said first end for securement of said strap to a mating connector part on said truck bed; and a plurality of tie-off loops stitched to said strap at about three foot intervals and configured to receive a lanyard hook and situated to provide a worker, wearing a body harness and a lanyard bearing said lanyard hook, a place to secure said lanyard hook to said strap.

2. A load securing apparatus as claimed in claim 1 wherein:

said strap is of webbing woven from at least one of polyester and nylon; and, said strap has a breadth of from 3 to 4 inches and a length of from 10 to 50 feet.

3. A load securing apparatus as claimed in claim 2 wherein:

each said tie-off loop is of webbing woven from at least one of polyester and nylon; and, said tie-off loops have a width of about 2 inches, a length of about 11½ inches and a span of about 4 inches between said stitching.

4. A load securing apparatus as claimed in claim 3 wherein said hook at said first end is a plate hook.

5. A load securing apparatus as claimed in claim 3 wherein said hook at said first end is a chain hook.

\* \* \* \* \*